United States Patent
Kassam-Adams et al.

(10) Patent No.: US 11,120,144 B1
(45) Date of Patent: Sep. 14, 2021

(54) METHODS AND SYSTEMS PROVIDING CENTRAL MANAGEMENT OF DISTRIBUTED DE-IDENTIFICATION AND TOKENIZATION SOFTWARE FOR SHARING DATA

(71) Applicant: Datavant, Inc., San Francisco, CA (US)

(72) Inventors: Shahir Kassam-Adams, Lovingston, VA (US); Jason A. LaBonte, Natick, MA (US); Paul J. Bayless, Burke, VA (US); Joseph Austin, Sterling, MA (US)

(73) Assignee: Datavant, Inc., San Francisco, CA (US)

( * ) Notice: Subject to any disclaimer, the term of this patent is extended or adjusted under 35 U.S.C. 154(b) by 335 days.

(21) Appl. No.: 16/382,428

(22) Filed: Apr. 12, 2019

Related U.S. Application Data

(60) Provisional application No. 62/656,915, filed on Apr. 12, 2018.

(51) Int. Cl.
 G06F 21/60 (2013.01)
 G06F 9/445 (2018.01)
 (Continued)

(52) U.S. Cl.
 CPC ........ G06F 21/602 (2013.01); G06F 9/44505 (2013.01); G06F 21/12 (2013.01);
 (Continued)

(58) Field of Classification Search
 CPC .... G06F 21/602; G06F 9/44505; G06F 21/12; G06F 2221/2101; G06F 2221/0775; H04L 9/083; H04L 9/0894
 See application file for complete search history.

(56) References Cited

U.S. PATENT DOCUMENTS 5,892,900 A * 4/1999 Ginter ................... G06Q 20/12
 726/26
6,397,224 B1 5/2002 Zubeldia et al.
 (Continued)

OTHER PUBLICATIONS http://mist-deid.sourceforge.net/ "MIST—The Mitre Identification Scrubber Toolkit".
(Continued)

*Primary Examiner* — J. Brant Murphy
(74) *Attorney, Agent, or Firm* — Morse, Barnes-Brown & Pendleton, P.C.; Sean D. Detweiler, Esq.

(57) ABSTRACT

A method and apparatus to provide: 1) De-identification and tokenization software (the Software) that calls a central management platform (the Vault) to retrieve the specific configuration elements needed to run; and 2) A central management platform (the Vault) from which distributed installations can be managed, including setting permissions, de-identification rules, tokenization schemes, and file layouts. Because the local Software contains no inherent configuration, it is universal and can be installed quickly at any site. Any new or modified configuration made centrally through the Vault can be immediately accessed by the Software without any change required at the local installation. Even when Software is installed locally across a distributed network of sites, a central authority using the Vault can control the configurations (de-identification rules, token creation schemes, etc.) used by those sites and audit all activities across the distributed network.

20 Claims, 10 Drawing Sheets

(51) Int. Cl.
*H04L 9/08* (2006.01)
*G06F 21/12* (2013.01)

(52) U.S. Cl.
CPC .......... *H04L 9/083* (2013.01); *H04L 9/0894* (2013.01); *G06F 2221/0775* (2013.01); *G06F 2221/2101* (2013.01)

(56) References Cited

U.S. PATENT DOCUMENTS

| | | | |
|---|---|---|---|
| 6,732,113 B1 | 5/2004 | Ober et al. | |
| 6,734,886 B1 | 5/2004 | Hagan et al. | |
| 6,804,787 B2 | 10/2004 | Dick | |
| 7,120,928 B2 | 10/2006 | Sheth et al. | |
| 7,269,578 B2 | 9/2007 | Sweeney | |
| 7,376,677 B2 | 5/2008 | Ober et al. | |
| 7,428,706 B2 | 9/2008 | Hagan et al. | |
| 7,519,591 B2 | 4/2009 | Landi et al. | |
| 7,526,485 B2 | 4/2009 | Hagan et al. | |
| 7,543,149 B2 | 6/2009 | Ricciardi et al. | |
| 7,587,366 B2 | 9/2009 | Grim, III et al. | |
| 7,668,835 B2 | 2/2010 | Judd et al. | |
| 7,711,120 B2 | 5/2010 | Kimmel et al. | |
| 7,792,517 B2 | 9/2010 | Mowry et al. | |
| 7,827,234 B2 | 11/2010 | Eisenberger et al. | |
| 7,865,376 B2 | 1/2011 | Ober et al. | |
| 7,945,048 B2 | 5/2011 | Ricciardi et al. | |
| 8,024,339 B2 | 9/2011 | Barker et al. | |
| 8,037,052 B2 | 10/2011 | Kariathungal et al. | |
| 8,042,193 B1 | 10/2011 | Piliouras | |
| 8,069,053 B2 | 11/2011 | Gervais et al. | |
| 8,090,595 B2 | 1/2012 | Hartman | |
| 8,121,984 B2 | 2/2012 | Barbieri et al. | |
| 8,176,334 B2 | 5/2012 | Vainstein | |
| 8,275,850 B2 | 9/2012 | Kohan et al. | |
| 8,296,299 B2 | 10/2012 | Haskell et al. | |
| 8,296,341 B2 | 10/2012 | Hagan et al. | |
| 8,341,427 B2 | 12/2012 | Auradkar et al. | |
| 8,355,923 B2 | 1/2013 | Gervais et al. | |
| 8,364,969 B2 | 1/2013 | King | |
| 8,381,287 B2 | 2/2013 | Trotter | |
| 8,473,452 B1 | 6/2013 | Ober et al. | |
| 8,494,874 B2 | 7/2013 | Green, III et al. | |
| 8,560,456 B2 | 10/2013 | Williams | |
| 8,566,113 B2 | 10/2013 | Friedlander et al. | |
| 8,577,933 B2 | 11/2013 | Evenhaim | |
| 8,589,437 B1 | 11/2013 | Khomenko et al. | |
| 8,656,161 B2* | 2/2014 | Nakae | H04L 63/105 713/168 |
| 8,661,249 B2 | 2/2014 | Guarraci et al. | |
| 9,292,707 B1 | 3/2016 | Fontecchio | |
| 9,614,814 B2* | 4/2017 | Fontecchio | H04L 9/0643 |
| 9,830,476 B2 | 11/2017 | Fontecchio | |
| 10,129,370 B2 | 11/2018 | Levy et al. | |
| 10,255,456 B2 | 4/2019 | Guglani et al. | |
| 10,713,390 B2 | 7/2020 | Anderson et al. | |
| 2002/0073138 A1 | 6/2002 | Gilbert et al. | |
| 2002/0173971 A1 | 11/2002 | Stirpe et al. | |
| 2003/0061482 A1* | 3/2003 | Emmerichs | G06F 21/62 713/165 |
| 2006/0053032 A1 | 3/2006 | Weiler et al. | |
| 2007/0067626 A1* | 3/2007 | Louis Briancon | H04L 63/102 713/168 |
| 2007/0162377 A1 | 7/2007 | Williams | |
| 2008/0003964 A1* | 1/2008 | Alperin | H04M 3/5233 455/185.1 |
| 2008/0147554 A1 | 6/2008 | Stevens et al. | |
| 2009/0106550 A1 | 4/2009 | Mohamed | |
| 2009/0287502 A1 | 11/2009 | Roberts et al. | |
| 2010/0042583 A1 | 2/2010 | Gervais et al. | |
| 2010/0070306 A1 | 3/2010 | Dvorak et al. | |
| 2010/0094758 A1 | 4/2010 | Chamberlain et al. | |
| 2010/0114607 A1 | 5/2010 | Kress et al. | |
| 2010/0205009 A1 | 8/2010 | Kostoff | |
| 2010/0211781 A1 | 8/2010 | Auradkar et al. | |
| 2010/0223467 A1 | 9/2010 | Dismore et al. | |
| 2010/0256994 A1 | 10/2010 | Eisenberger et al. | |
| 2011/0191245 A1 | 8/2011 | Ricciardi et al. | |
| 2012/0036360 A1 | 2/2012 | Bassu et al. | |
| 2012/0116800 A1 | 5/2012 | McCallie et al. | |
| 2012/0124637 A1 | 5/2012 | Dunaway | |
| 2012/0159637 A1 | 6/2012 | Dove et al. | |
| 2012/0173884 A1* | 7/2012 | Patil | G06F 21/6209 713/189 |
| 2012/0204032 A1 | 8/2012 | Wilkins et al. | |
| 2012/0226916 A1 | 9/2012 | Hahn et al. | |
| 2012/0303558 A1 | 11/2012 | Jaiswal | |
| 2012/0316898 A1 | 12/2012 | Levitt et al. | |
| 2013/0117126 A1 | 5/2013 | Coppinger | |
| 2013/0117128 A1 | 5/2013 | Coppinger | |
| 2013/0246097 A1 | 9/2013 | Kenney et al. | |
| 2013/0304504 A1 | 11/2013 | Powell | |
| 2013/0304542 A1 | 11/2013 | Powell | |
| 2013/0346104 A1 | 12/2013 | Pillai | |
| 2014/0013452 A1 | 1/2014 | Aissi et al. | |
| 2014/0040308 A1 | 2/2014 | Ober et al. | |
| 2014/0041047 A1 | 2/2014 | Jaye et al. | |
| 2014/0108049 A1 | 4/2014 | Fuhrmann et al. | |
| 2014/0108258 A1 | 4/2014 | Williams | |
| 2014/0122873 A1 | 5/2014 | Deutsch et al. | |
| 2015/0086020 A1* | 3/2015 | Harjula | H04L 9/30 380/279 |
| 2015/0089357 A1 | 3/2015 | Vandervort et al. | |
| 2015/0095243 A1 | 4/2015 | Eiler et al. | |
| 2015/0095252 A1 | 4/2015 | Mattsson et al. | |
| 2015/0149208 A1* | 5/2015 | Lynch | G16H 10/60 705/3 |
| 2016/0110648 A1 | 4/2016 | Baveja et al. | |
| 2016/0147945 A1* | 5/2016 | MacCarthy | G06F 21/6254 705/51 |
| 2016/0267238 A1 | 9/2016 | Nag | |
| 2016/0275309 A1* | 9/2016 | Austin | G06F 21/6254 |
| 2016/0344544 A1 | 11/2016 | Biesinger et al. | |
| 2017/0103179 A1 | 4/2017 | Jiao et al. | |
| 2017/0243028 A1 | 8/2017 | LaFever et al. | |
| 2019/0138698 A1* | 5/2019 | Qiu | G06F 21/629 |

OTHER PUBLICATIONS

Third Party Submission Under 37 CFR 1.290 for U.S. Appl. No. 15/045,605, made/submitted Mar. 29, 2019.
Notice of Allowance for U.S. Appl. No. 15/045,605, dated Oct. 14, 2020.
Non-Final Office Action for U.S. Appl. No. 16/382,462, dated Oct. 29, 2020.
Non-Final Office Action for U.S. Appl. No. 16/684,541, dated Feb. 18, 2021.
Notice of Allowance for U.S. Appl. No. 16/135,972, dated Jan. 28, 2021.
Notice of Allowance for U.S. Appl. No. 16/382,462, dated Mar. 3, 2021.
Notice of Allowance from U.S. Appl. No. 16/382,447, dated Apr. 12, 2021.
Final Office Action from U.S. Appl. No. 15/045,605, dated Nov. 4, 2019.
Final Office Action for U.S. Appl. No. 15/045,605, dated May 8, 2020.
Non-Final Office Action from U.S. Appl. No. 16/135,972, dated Aug. 13, 2020.
Non-Final Office Action from U.S. Appl. No. 16/382,447, dated Dec. 16, 2020.
Non-Final Office Actioon from U.S. Appl. No. 15/045,605, dated Feb. 13, 2020.
Non-Final Office Action U.S. Appl. No. 15/045,605, dated Jul. 18, 2019.
Notice of Allowance for U.S. Appl. No. 16/684,541, dated Jun. 8, 2021.

* cited by examiner

METHODS AND SYSTEMS PROVIDING CENTRAL MANAGEMENT OF DISTRIBUTED DE-IDENTIFICATION AND TOKENIZATION SOFTWARE FOR SHARING DATA

CROSS-REFERENCE TO RELATED APPLICATION(S)

This application claims priority to and the benefit of U.S. Patent Application 62/656,915 filed Apr. 12, 2018. The disclosure of said application is hereby incorporated by reference in its entirety. This application is also related to U.S. application Ser. No. 15/045,605, filed Feb. 17, 2016. The disclosure of said application is hereby incorporated by reference in its entirety.

FIELD OF THE INVENTION

The present invention relates generally to a system for centrally managing, configuring, running and monitoring a distributed network of encryption software, in particular, de-identification and tokenization software. More specifically, the present invention relates to an online platform that can support multiple segregated users and allow them to configure the permissions, de-identification rules, token designs and encryption keys, and file formats of the data to be processed at each installation, and audit all such activity, as well as a locally-installed software package that calls this central platform to retrieve permissions and the configuration package required to correctly process the data, and at completion passes back a log file for inclusion in the central audit log.

BACKGROUND

Generally, regulations and laws protecting the privacy of personal data have created a plethora of strategies for protecting the identity of personal data. For example, it is a potential Health Insurance Portability and Accountability Act (HIPAA) violation to incorporate personal health information (PHI) elements into a healthcare data set. Accordingly, to be compliant with government regulations, all PHI data elements must be removed and/or de-identified before being incorporated into any healthcare data set. Typically, institutions, organizations, and businesses that create personal data have their own methods for complying with identity protection laws. These methods may include in-house developed proprietary methods, or one of many disparate off-the-shelf solutions. The conventional methods utilized for protecting personal data have been responsible for serious identity breaches resulting in the theft of customer and employee personal information. Conventional methods implement processes of de-identification by the use of hashing methods applied to strings of characters generated from private data elements in data records. These conventional processes are built using a single hashing seed or encryption key, which is shared across many disparate target sites. Such systems suffer the risk that the resulting generated values can be mapped back to the original source data. Once a breach has occurred, all the target data sites have exposed values which, in themselves, could become regulated data values. Conventional processes also create problems because once PHI data elements are removed from record, users have no way to understand which individuals in the data set match the de-identified individuals, and so conventional healthcare data systems are limited in their ability to identify the existence of duplicate records or duplicate individuals from individual de-identified records in healthcare data sets.

Additionally, the personal data records stored by the various entities cannot be shared or aggregated for any meaningful or useful data analysis. Specifically, the personal data cannot be shared between entities where the identity any one particular individual is of no importance. A problem associated with protected personal data is easily recognizable in the industries related to healthcare where each provider or insurer typically employs their own proprietary methods for de-identifying personal data records, making it nearly impossible to do any meaningful aggregations of the data for important clinical research or cost analysis at higher regional, state, or national levels. This problem is compounded by the fact that there are many separate and distinct companies involved with the care of an individual patient, making it difficult to share and or tie the information together for a single patient once the stake holder has applied their own proprietary de-identification process to the patient's personal data records. An additional problem is that conventional methods utilized for protecting personal data are ill-equipped to adopt changes in the manner in which person data must be protected, both due to changes in law, regulations or requirements for handling data, and due to changes in entities storing the records, resulting in data redundancies, and retrofitting that compromise efficiency, robustness and security of conventional systems.

Previous solutions have involved a de-centralized key management service that provides a trusted secure site to manage key ownership and sharing between disparate entities. A decentralized process uses authorized encryption keys to standardize shareable tokens at partnering entity sites. Personal data records created and stored at de-centralized locations, at the entity site, use the encryption or site key information provided by the centralized key management architecture to enable secure sharing of their respective personal data records. The central key management architecture does not maintain de-centralized token data and only serves as a management hub for the distribution of encryption keys and standardization of tokens at an entity site level. Such solutions involve embedding the de-identifications rules, token creation algorithms, and other required elements within the software that is run locally on the data to be processed. Thus, changes to these elements require the reconfiguration and re-installation of the software and the maintenance of multiple copies of the software if the user wishes to maintain multiple configurations (i.e. one copy for each configuration).

These and other shortcomings described herein existing in the conventional approaches to sharing personal, private, or otherwise protected data area a problem that would not exist but for the present need for and utilization of computer technology handling such data. With so many disparate forms of data and computer systems managing the data, the difficulties in handling such data in a way that provides desired access and utilization of the data without violating privacy guidelines or putting personal data records at risk have been caused by the implementation of the computer technology that prior to the present invention conventionally handled such data.

SUMMARY

There is at least a need for a system that allows for a central user to add, modify, or delete new sites, users, and configurations for use by distributed de-identification and tokenization software installations, and to make those changes in real-time so that the distributed installations have them available without any change to the locally-installed software. There is a need for improvements for enabling data sets containing PHI, personally identifying information (PII), private, secret or confidential data within records of individuals to be accessible and useable without exposing protected PHI, PII, private or confidential information of the individual, while being able to aggregate data sets by matching de-identified data and preventing instances of repetition without resorting back to that protected information. The present invention is directed toward further solutions to address these needs, in addition to having other desirable characteristics.

The system of the present invention includes two primary components: a central configuration platform (the Vault), and a software package that is installed locally (the Software). In certain implementations a private or secure storage (Secrets system) is also employed to store the data from the central configuration platform (the Vault).

The central configuration platform (Vault) is a secure portal that is hosted online in a public or private cloud or network and that supports three types of activity: managing site and user permissions, managing the configurations of the local software, and auditing all activity across the central and distributed components. In implementations using the private or secure storage (Secrets System), the permissions, encryption keys, hash seed, and final configuration file created and managed by the central configuration platform (Vault) are stored in the Secrets System so that they are secured from Vault users. These elements are made available to the Software through a secure network call. The Software includes any number of locally-installed software packages for creating and manipulating de-identified and tokenized data sets. At run-time, the Software makes a secure network call to the Secrets System to validate permissions, and retrieve permitted elements required to run the Software (e.g. hash seed, encryption key, and or configuration file). The Software uses these retrieved elements to process the data locally, and discards these elements upon completion, thereby allowing the most current version of these elements to be used at each subsequent run. The Software also has the ability to make a network call to the Central configuration platform (Vault) to ask for permission to run if it has not already been granted, and to pass back a log file at the conclusion of a run for central auditing and monitoring purposes.

The present invention is a stand-alone product, but it can be integrated with other data processing or monitoring systems (e.g. with data ETL processes, or with other auditing and monitoring tools, etc.).

The present invention provides: 1) De-identification and tokenization software (the Software) that calls a central platform (the Vault, with or without the Secrets system) to retrieve the specific configuration elements needed to run; and 2) A central platform (the Vault) from which distributed installations can be managed, including setting permissions, de-identification rules, tokenization schemes, and file layouts.

Because the local Software contains no inherent configuration, it is universal and can be installed quickly at any site. Any new or modified configuration made centrally through the Vault can be immediately accessed by the Software without any change required at the local installation. Even when Software is installed locally across a distributed network of sites, a central authority using the Vault can control the configurations (de-identification rules, token creation schemes, etc.) used by those sites. An illustrative embodiment of the present invention relates to a specific system and method that improves the existing technology by reciting specific structures, functions and steps that accomplish the desired result through an inventive arrangement by combining a central management platform having a secure data storage module, isolated and secure from the centralized management platform, with one or more registered instances of software deployed on one or more client devices to process healthcare or personal data by enabling client computing devices to communicate with the central management platform to obtain necessary data to encrypt data on the one or more client devices over one or more telecommunication networks. This enables encrypting data records stored by each of the one or more client devices in a manner that does not violate HIPAA or other privacy related regulations that restrict PHI or PII. In particular, the system allows for a central user to add, modify, or delete new sites, users, and configurations for use by distributed de-identification and tokenization software installations, and to make those changes in real-time so that the distributed installations have them available without any change to the locally-installed software. This allows data sets containing PHI, personally identifying information (PII), private, secret or confidential data within records of individuals to be accessible and useable without exposing protected PHI, PII, private or confidential information of the individual, while being able to aggregate data sets by matching de-identified data and preventing instances of repetition without resorting back to that protected information. The managing includes creating audit logs regarding the record, user and configuration, as well as capturing context for each activity, and analyzing, transmitting, storing or otherwise using the record in an encrypted form. This provides a technological improvement over conventional systems that lack the capability to both preserve de-identification and preserve the ability to aggregate data without repetition, and further lack any capability to track changes in licensing files or configuration files from the central management platform or perform updates to comply with modified laws, regulations, requirements or entity structure. The detailed steps integrate the processing and encryption of personal data into a practical application of a central management platform that improves the organization of encrypted data that can be aggregated and analyzed while using site-specific elements and final elements that are isolated from direct user manipulation or interference, allowing for adaptation of the software to new requirements or configurations while maintaining data security and tracking beyond what was possible in conventional decentralized encryption methods. This specific manner of centralized parameter and element management and control is the technological improvement created by the claimed invention that allows data to be more efficiently encrypted with added information and capabilities that provide advancements over simply data encryption and management that were formerly not possible.

The connection of the Software network through the Vault allows distributed sites to arrange linkages between each other, with no need for the software provider to be involved. Even when Software is installed locally across a distributed network of sites, a central authority can monitor and audit the activity of all users through the Vault. And when a site does not have permission to perform an action (e.g. run the software, or make a configuration change), the site can make a request through the Vault to have that action performed.

The Vault is multi-tenant, and though they share the underlying logic, each tenant on the Vault (and the sites they control) can customize the de-identification rules, token schemes, and even data field labels they view on the Vault (e.g. "postal codes" for UK users, "zip codes" for US users).

In accordance with example embodiments of the present invention, a method for centrally managing one or more instances of encryption software deployed remotely is provided. The method includes registering, at a central management platform comprising one or more computing devices with processors, memory, and storage, one or more instances of software deployed on one or more client devices comprising processors, memory and client storage devices; assigning, at the central management platform, a unique encryption key and permissions to each of the one or more registered instances of software deployed on one or more client devices; identifying, at the central management platform, parameters and requirements for each of one or more registered instances of software deployed on one or more client devices; generating, at the central management platform, a configuration file for each of the one or more registered instances of software deployed on one or more client devices; providing the unique encryption key and the configuration file to each of the one or more registered instances of software deployed on one or more client devices; and storing the unique encryption key, the permissions, and the configuration file for each of the one or more registered instances of software deployed on one or more client devices using a secure data storage module that provides an implementation of the storage isolated and secure from the centralized management platform, enabling client computing devices to communicate with the central management platform to obtain necessary data to encrypt data on the one or more client devices over one or more telecommunication networks to enable encrypting data records stored by each of the one or more client devices.

In accordance with aspects of the present invention, registering one or more instances of software can comprise modifying parameters and requirements for the one or more instances of software deployed on one or more client devices. The parameters and requirements can comprise: deployment sites, user permissions, de-identification rules, token creation rules, and field names and data layouts for associated with each of the registered instances of software.

In accordance with aspects of the present invention, the method further can comprise tracking, using a monitoring and audit portal, any changes made to the parameters and requirements.

In accordance with aspects of the present invention, permissions for each of the registered instances of software or user thereof can be based on a license file associated with each of the registered instances of software or user thereof. The generation of a configuration file can be based on a data processing map that is generated based on de-identification rules, token creation rules, and field names and data layouts associated with each of the registered instances of software. The unique encryption keys and the token creation rules can be used by the central management platform to provide token management of the data records on each of the one or more client devices. The central management platform can comprise additional standardized rule sets and field names and data layouts beyond the de-identification rules, the token rules, and the input and output field names and data layouts, that are combined or segmented in multiple ways to creates lists of different granularity for one or more of a subset selected from the group consisting of users, sites, tenants and the one or more registered instances of software deployed on one or more client devices. Additional data, such as non-configurable secret data comprising master hash seeds or salts, also can be provided by the management platform to be used in encrypting data records stored for each of the one or more client devices.

In accordance with example embodiments of the present invention, a method of encrypting data using deployed software which is managed centrally is provided. The method comprises obtaining, at a client device comprising a processor, memory, and a storage device, and operating a deployed instance of centrally managed software, data to be encrypted; requesting, at the client device operating a deployed instance of centrally managed software, configuration data for centrally managed software from a central management platform comprising one or more computing devices with processors, memory, and storage; receiving, at the client device operating a deployed instance of centrally managed software, a unique encryption key and a configuration file for the deployed instance of the centrally managed software from a central management platform; performing, at the client device operating a deployed instance of centrally managed software, encryption on the obtained data based on the received unique encryption key and a configuration file for the deployed instance of the centrally managed software from a central management platform; and outputting, at the client device operating a deployed instance of centrally managed software, data encrypted by the deployed instance of the centrally managed software based on the received unique encryption key and a configuration file for the deployed instance of the centrally managed software from a central management platform.

In accordance with aspects of the present invention, receiving the unique encryption key and configuration file can be conditioned upon successful verification of credentials using a permission check performed at the central management platform. The permission check further comprises the central management platform checking a license file to determine if a user and site are allowed to perform requested processing, wherein if the license file is valid, the secure data storage module returns to the centrally managed software certain site-specific elements comprising the unique encryption key, the configuration file, and non-configurable secret data required to properly process data records or an input data file.

In accordance with aspects of the present invention, the centrally managed software uses the site-specific elements retrieved from the central management platform to process the data records or the input data file locally, and then discards the site-specific elements upon completion, thereby allowing a most current version of the site-specific elements to be used at each subsequent run. Storage of private data including the site-specific elements can comprise the unique encryption key, the configuration file, as well as the non-configurable secret data comprising master hash seeds or salts, using the secure data storage module, can prevent users of the central management platform from viewing or accessing the site-specific elements, thereby protecting overall security of the system, and wherein use of a storage device implemented in a secure data storage module, to also hold final elements, comprising the license file and configuration file, prevents users from modifying the license file and configuration file directly, only allows modification through auditable processes using the central management platform, wherein whenever the centrally managed software makes a network call requesting a permission check to run, the network call and the permission check are also recorded in an audit log. Whenever a user adds permissions or modifies any of the permissions, including by deleting permissions, on the central management platform, those permissions can be passed to the secure data storage module and stored as a license file, and whenever a user adds a data processing map or modifies a data processing map, including by deleting a data processing map, using configuration processes, the system generates a configuration file that is transferred to and stored using the secure data storage module, where that configuration file is then made available for the centrally managed software to retrieve at run time, such that changes to the license file and changes to the configuration file are made in real-time so as to be available without any change to the locally-installed software.

In accordance with aspects of the present invention, the method can provide to the central management platform, a log for the encryption performed on the obtained data based on the received unique encryption key and a configuration file for the deployed instance of the centrally managed software from a central management platform.

In accordance with example embodiments of the present invention, a system for centrally managing one or more instances of encryption software deployed remotely is provided. The system includes a central management platform comprising one or more computing devices with processors, memory, and a storage for storing a data associated with one or more instances of software deployed on one or more client devices comprising processors, memory and client storage devices, the central management platform operable to: register one or more instances of software deployed on one or more client devices; assign a unique encryption key and permissions to each of the one or more registered instances of software deployed on one or more client devices; identify parameters and requirements for each of the one or more registered instances of software deployed on one or more client devices; generate a configuration file for each of the one or more registered instances of software deployed on one or more client devices; and provide the assigned unique encryption key and generated configuration file to each of the one or more registered instances of software deployed on one or more client devices; and a secure data storage module, comprising the storage isolated and secure from the centralized management platform, configured to store the unique encryption key, the permissions, and the configuration file for each of the one or more registered instances of software deployed on one or more client devices, and enable the one or more client devices to communicate with the central management platform to obtain necessary data to encrypt data on the one or more client devices over one or more telecommunication networks to enable encrypting data records stored by each of the one or more client devices.

In accordance with aspects of the present invention, the system further can comprise a secure data storage module comprising storage operable to store the unique encryption key, permissions, and configuration file for each of the one or more registered instances of software deployed on one or more client devices. In accordance with aspects of the present invention, one or more client devices can comprise a client storage device for storing a deployed instance of centrally managed software, the one or more client devices configured by the centrally managed software to: obtain data to be encrypted; request configuration data for centrally managed software from the central management platform; receive a unique encryption key and a configuration file for the deployed instance of the centrally managed software from the central management platform; perform encryption on the obtained data based on the received unique encryption key and a configuration file; and output data encrypted based on the received unique encryption key and a configuration file.

In accordance with aspects of the present invention, the system can comprise a monitoring and audit portal operable to track any changes made to the parameters and requirements and receive and store a log provide from the client device, wherein the system comprises a common set of elements used for all data processed by the centrally managed software so that all data is consistently de-identified and tokenized, enabling the system to be certified once for all installations, and enabling commonly-tokenized data to be matched from any different site, regardless of whether it originated from a common network.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
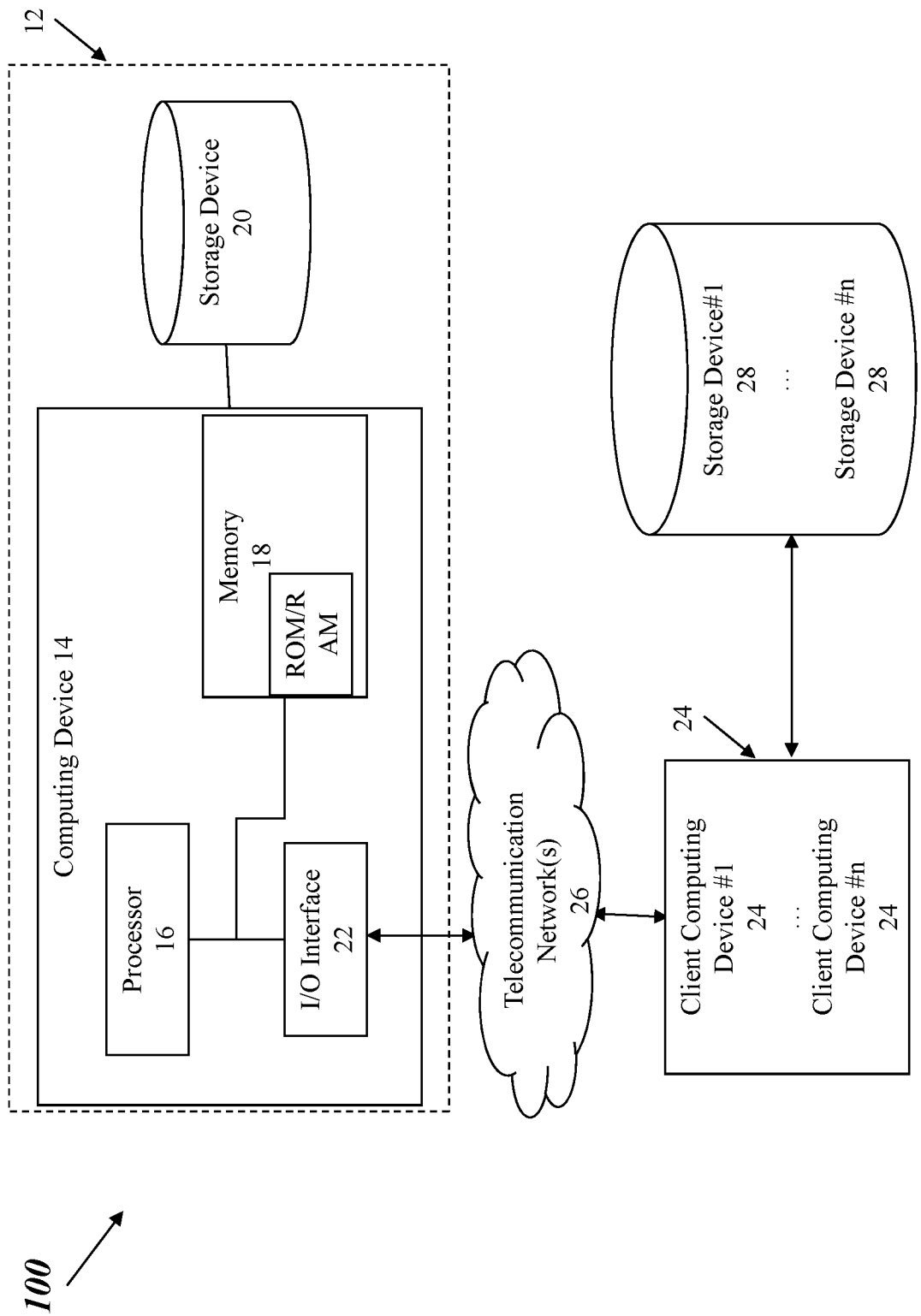
FIG. 1 is a diagrammatic illustration of a system for implementing an encryption management system in accordance with the aspects of the invention.

An illustrative embodiment of the present invention relates to a specific system and method providing central management of distributed de-identification and tokenization software for sharing data while preserving encryption that improves the existing technology by reciting specific structures, functions, and steps that accomplish the desired result through an inventive arrangement by combining personal data with healthcare data in a manner that does not violate HIPAA or other privacy related regulations that restrict PHI or PII. In particular, data is aggregated from different sources or obtained by one or more instances of software deployed on one or more client devices, data is de-identified by removing or modifying all elements regarded as protected health information or personally identifying information, and a unique encrypted person token is added to each record. The "tokenized" data is merged with other healthcare or personal data sets that have been de-identified and tokenized in a similar process, that uses a combined order of specific incorporated rules and functions, not mere use of the computer and existing data processing technology, that improves the existing data management technological processes that renders encrypted information into a specific format that is then used and applied to create desired results of data sets that can be used together in an encrypted and privacy preserving manner. In accordance with aspects of the present invention, computing hardware devices are tied to the method steps, which include at least one transforming step. Specifically, the present invention involves multiple transformation steps necessarily tied to the computing hardware devices. Additionally, the transformation steps performed in the present invention are designed to provide an improvement necessitated by changes in technology (e.g., multiple instances of the same encryption software) and that the present invention solves the problem created by these changes in technology (e.g., the need to be able to manage the multiple instances of the encryption software). Accordingly, the present invention is also an improvement to the technical area of software configuration and encryption management. Advantageously, the process of the present invention can further yield data that can be aggregated and analyzed for the purposes of valuable research, which conventional systems lack. Specifically, the healthcare or other personal data sets are merged with the existing personal data records by matching the unique encrypted person tokens associated with each data record with one another and the data records with matching unique encrypted person tokens are merged together. Using the system and method of the present invention provides a specific, non-abstract improvement to computer functionality that enables "individuals" (e.g., de-identified healthcare records) in a healthcare or personal data set to be tracked without exposing protected health information or personal identification data. This represents a practical application of a centralized encryption management platform that enables databases or data structures containing health care data sets, operated by separate, potentially unrelated entities, to query, receive, and incorporate (including by merging) data sets while the parties are using the central management platform, including related data in a separate database or data structure that ordinarily would not be capable of interacting due to the above discussed restrictions on combining such data and the existing technological requirements of reproducing data within data structures in order to preserve unique identifiers, encryption, and data used to accurately correlate or match data based on association with an underlying entity. The data sets created by the present invention, contain the de-identified unique encrypted person tokens, an indicator of the individual previously identified in the data record, and personal data record data that is encrypted by the central management platform unique encryption key and the configuration file to each of the one or more registered instances of software deployed on one or more client devices that is stored using the secure data storage module and storage device. This transformed data functions differently than, and achieves benefits over, conventional database methods, structures, and data therein, providing increased flexibility, and the ability to combine otherwise un-combinable data sets. To improve accuracy without sacrificing privacy and data security, the encrypted person token is unique to a particular individual. Once the data sets are merged, a user can perform analysis of anonymous healthcare or personal data with the added benefit of the indications for the de-identified individuals originally associated with the records. This functionality provides many added benefits not previously available. The de-identification of healthcare or personal data sets provided by the present invention enables tokens to be merge-able with the healthcare data sets in such a way that data sets from disparate sources but relating to a same individual can be matched up and associated with each other without the exposure of PHI or PII.

As would be appreciated by one skilled in the art, the present invention also dramatically increases the capabilities of entities to comply with federal and state privacy laws. In particular, the present invention allows for controlled sharing of disparate data. Accordingly, the process carried out in the present invention produces a consistent, repeatable and certifiably compliant method of protecting personal information, when sharing data, while still maintaining the rights of data sources to protect their data.

FIGS. 1 through 10, wherein like parts are designated by like reference numerals throughout, illustrate an example embodiment or embodiments of the centralized key management system for sharing personal data between the plurality of de-centralized entities, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, in a manner still in keeping with the spirit and scope of the present invention.

FIG. 1 depicts a high-level system architecture of implementing processes in accordance with aspects of the present invention. Specifically, FIG. 1 depicts a computing system 100 including a centralized management platform 12 including a computing device 14 having a processor 16, a memory 18, storage 20, and an input/output interface 22. The centralized management platform 12, including the computing device 14, may be a general purpose computer or a specialized computer system. For example, the computing device 14 may include a single computing device, a collection of computing devices in a network computing system, a cloud computing infrastructure, or a combination thereof, as would be appreciated by those of skill in the art. In accordance with example embodiments, the computing device 14 may be a server system in communication with a database (e.g., storage device 20). Similarly, as would be appreciated to one of skill in the art, the storage device 20 may include any combination of computing devices configured to store and organize a collection of data. For example, the storage device 20 may be a local storage device on the computing device 14, a database storage component of the centralized management platform 12, a remote database facility, or a cloud computing storage environment. The storage device 20 may also include a database management system utilizing a given database model configured to interact with a user for analyzing the database data.

The computing system 100 of FIG. 1 may further include a plurality of client computing devices 24 each executing client software. Similar to the computing device 14, the client computing devices 24 may each include a single computing device, a collection of computing devices in a network computing system, a cloud computing infrastructure, or a combination thereof, as would be appreciated by those of skill in the art. Additionally, the client computing devices 24 may each include or otherwise be in communication with storage device(s) 28. As would be appreciated by one skilled in the art, the storage device(s) 28 may be similar to the storage device 20 in architecture and implementation. In accordance with example embodiments of the present invention, the plurality of client computing devices 24 may be de-centralized devices located remotely from the centralized key management platform 12. For example, each of the plurality of client computing devices 24 may be independent institutions, organizations, and businesses, each collecting and storing a variety of personal data records.

Figure 2:
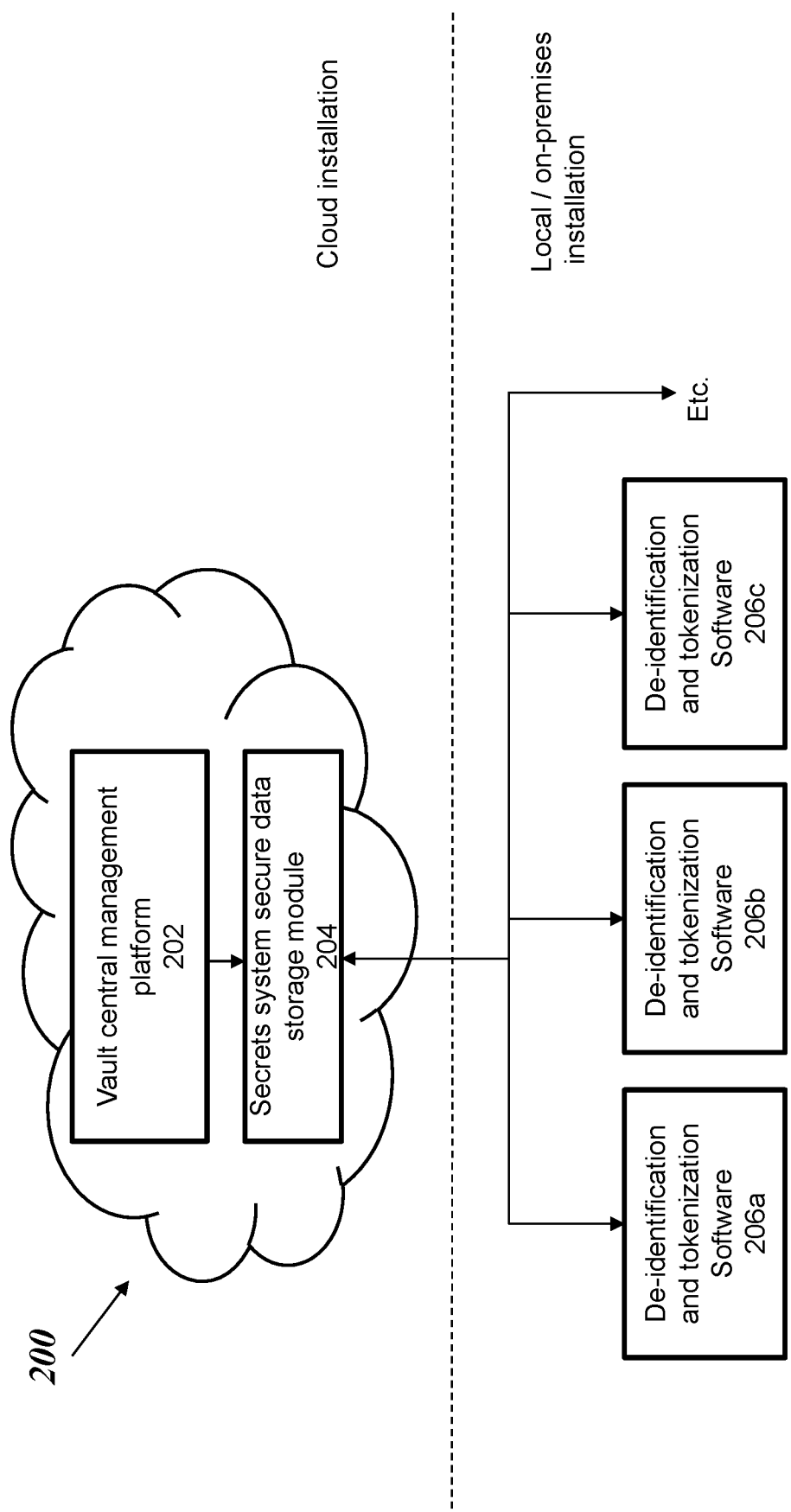
FIG. 2 is a diagrammatic illustration of a network of distributed encryption software (Software) installations managed through a central configuration platform (Vault), with configuration files stored in a secure storage (Secrets System) in accordance with the aspects of the invention.

The functionality of the present invention is provided by the hardware of FIG. 1 through the execution of software that makes the hardware perform in the desired manner. FIG. 2 depicts one possible implementation of a system 200 of software modules operating on the hardware of FIG. 1 to provide a cloud based system in accordance with aspects of the present invention. The system 200 of FIG. 2 includes a central management platform module 202, referred to here as the Vault; a secure data management module, referred to here as Secrets system 204; and client encryption software modules 206, referred to here as Software. The central data management module, or Vault, 202 provides the functionality of central management platform 12 on the computing device 14 of FIG. 1. The central data management module (the Vault) 202 can be hosted in a public cloud, a private cloud, or on a local server.

The secure data management module, or the Secrets system, 204 provides an implementation of the storage device 20 of FIG. 1 wherein the data stored there is isolated and secure from the centralized management platform 12 of Vault module 202. The secure data management module (Secrets System) 204 can be stored in the same or different location as the Vault 202. As with the Vault 202, the Secrets System 204 can be hosted in a public cloud, a private cloud, or on a local server.

Lastly, the Software module 206 is the distributed client software executing on client computing devices 24 of FIG. 1 to provide data encryption. The Software 206 can be installed in a separate location(s) from the Vault 202 and Secrets System 204, but it can also be installed in the same location as the Vault 202 and/or Secrets System 204.

The centralized management platform 12, such as implemented by the Vault module 202, may be configured to communicate and exchange data with the plurality of client computing devices 24, via the software modules 206. In accordance with an example embodiment of the present invention, the system of modules 200 on the computing devices 12, 14, and 24 may be configured to establish a connection and communicate over telecommunication network(s) 24. For example, the centralized management platform 12 and the plurality of client computing devices 24 may be configured to communicate over the telecommunication network(s) 26 using the input/output interface 22. As would be appreciated by one of skill in the art, the telecommunication network(s) 26 may include any combination of known networks. For example, the telecommunication network(s) 26 may be combination of a mobile network, WAN, LAN, or other type of network. The telecommunication network(s) 26 may be used to exchange data between the computing device 14 and the client computing devices 24, exchange data with the storage devices 20 and 28 (e.g., in a cloud environment), and/or to collect data from additional sources. For example, the software 206 of client computing devices 24 may communicate with the Vault module 202 and Secrets system module 204 of the management platform 12 to obtain the necessary data to encrypt data on the client computing devices 24 over the telecommunication network(s) 26.

In operation, the management platform 12, such as provided by the Vault 202, is responsible for managing data for client software 206 on the client computing devices 24 to facilitate encrypting data records stored by each of the client computing devices 24. For example, the management platform 12 provided by the central data management module 202, may manage data for multiple entities (e.g., at the entities; software on client computing devices 24) which have disparate personal data records (e.g., healthcare data records). Prior to using the encryption on the personal data records of the entities, the software 206 on each of the client computing devices 24 may need to be registered with the management platform 12. As would be appreciated by one skilled in the art, the registration process may include the creation of a new account for the registering party and a verification process to ensure that the registering party is a trusted entity. For example, the software on each of the client computing devices 24 may provide the management platform 12 with credentials verifying that they are a legitimate entity. Additionally, in accordance with example embodiments of the present invention, the management platform 12 may require that each of the registering client computing devices 24 pay a subscription fee to use the services provided by the management platform 12. For example, as would be appreciated by one of ordinary skill in the art, the client computing devices 24 may be responsible for a monthly subscription fee to use the service.

Once registered, each of the client computing devices 24 or sites are assigned a unique encryption key (or site level key). Advantageously, the use of the encryption keys may be used by the management platform 12 to provide token management of the personal data records on each of the client computing devices 24. In accordance with example embodiments, the unique encryption keys may be created and assigned to each of the software modules 206 on the client computing devices 24 by the management platform 12. For example, at the time of registration, the management platform 12 will create a unique encryption key specific to the particular client computing devices 24 or site. The created unique encryption key may then be transmitted to the software 206 on the client computing devices 24 to be associated with the unique encryption key within the management platform 12. Alternatively, in accordance with example embodiments, the client computing devices 24 may provide their own unique encryption key to be stored and implemented by the management platform 12. As would be appreciated by one of skill in the art, the management platform 12 may check the provided encryption key with existing encryption keys for previously registered client computing devices 24 to prevent duplicate keys. Accordingly, in the instance that the provided encryption key is not unique, the management platform 12 may request a new key or create a new unique encryption key for that particular client computing devices 24.

In accordance with example embodiments of the present invention, the management platform 12 may further include additional elements associated with the individual distributed clients such as business rules and legal and regulatory requirements. The business rules may be a set of rules for managing personal data records as implemented by the software 206 on the client computing devices 24 and may identify how the personal data records should be formatted for transmittal by that client computing device 24. Additionally, the business rules may control the use of segments of the data within the personal data records. For example, one data source may be restricted to identifying provider names, while other data sources may have geographic or sub-contractual restrictions. Similarly, the legal and regulatory requirements may be rules specific to the type of data being stored or exchanged by the client computing devices 24. For example, the management platform 12 may store rules implementing the HIPAA (Health Insurance Portability and Accountability Act of 1996) privacy regulations in the storage device 20, to be applied with respect to personal data records (e.g., patient health records) being exchanged between client computing devices 24. The management platform 12 may be configured to determine legal and regulatory requirements, by accessing the requirements in the storage device 20, associated with the business rules for the involved entities. In accordance with example embodiments of the present invention, the unique encryption keys may be created and/or deemed satisfactory based on the legal and regulatory requirements. Accordingly, the management platform 12 is responsible for the permissions, encryption keys, and configuration detail management based on the business rules and legal and regulatory requirements of the client computing devices 24. For example, the management platform 12 ensures that the encryption keys to satisfy a certain level of encryption defined by the legal and regulatory requirements.

In certain embodiments, the management platform 12 may allow for the editing or modification of the data associated with the specific client computing devices 24. An example of this can be seen in FIG. 3.

Figure 3:
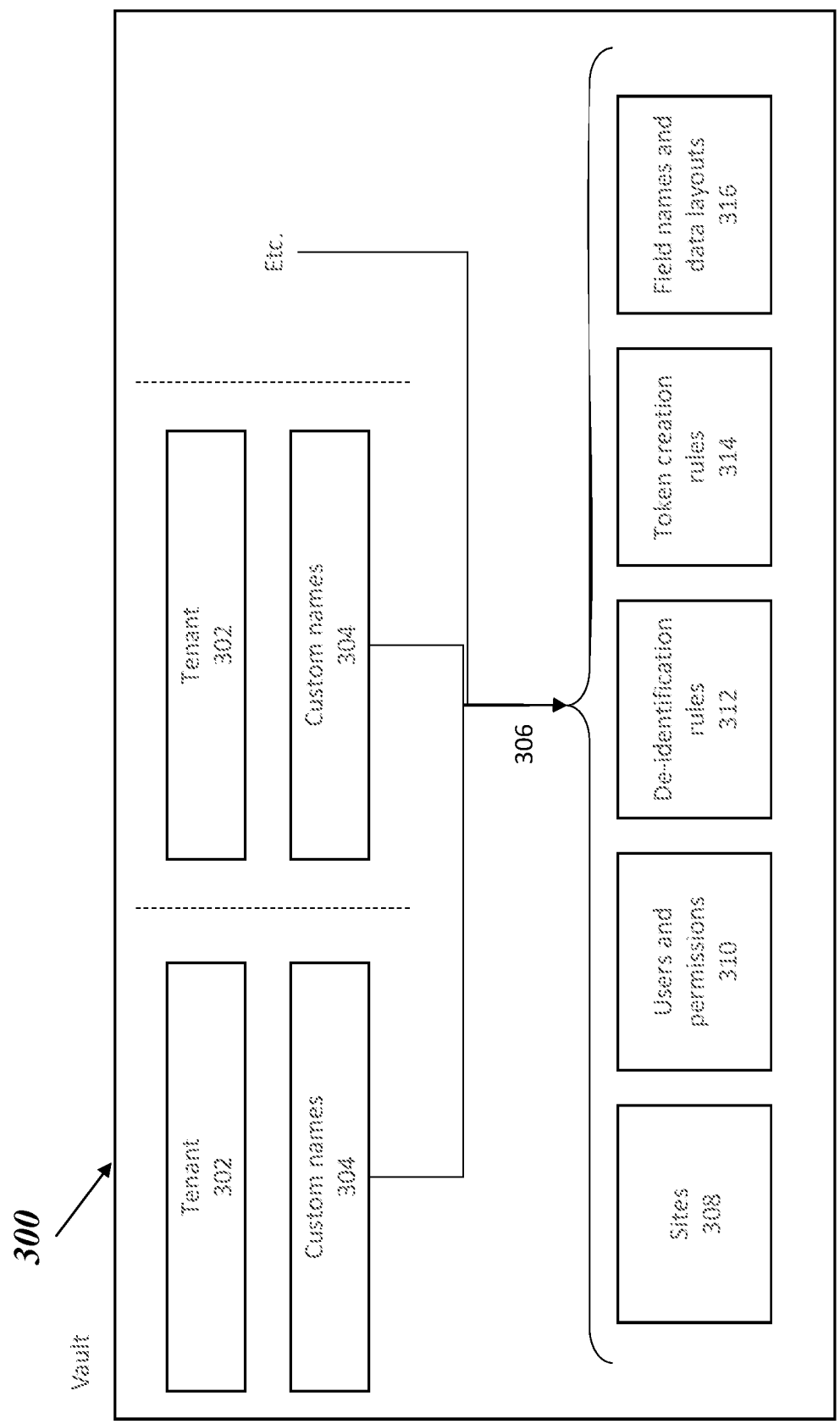
FIG. 3 is a is a diagrammatic illustration of the multi-tenant central configuration platform (Vault) system that stores master lists of elements that can be custom named for each tenant in accordance with the aspects of the invention.

FIG. 3 depicts an example of the data or elements associated with individual software instances 206 on client computing devices 24 that can be managed by a management platform 12, such as the Vault module 202 of FIG. 2. In this example, the Vault 202 supports a multi-tenant environment 300 such that each tenant 302 can manage their network, users, and software independently. The tenant 302 is afforded a custom set of labels 304 for their interface on the Vault 202. The tenant-specific labels 304 relate to a master set of elements 306 necessary for the configuration, management, and auditing of the Software 206 on the client computing devices 24. The elements 306 include the addition/deletion of Software installation sites 308, such as on a client computing device 24; users and permissions 310; a list of de-identification rules 312 for use by the Software 206; a list of token creation and transformation rules (token rules 314) for uses by the Software 206; a list of standard field names and data layouts 316 used by the Software 206; and other similar elements used by the Software 206 to correctly process data.

The management platform 12, such as the Vault 202, can be multi-tenant, or single tenant, or a separate instance of the Vault 202 can be created for use by users wanting a private environment.

A user can configure the Software 206 through the Vault 202 by selecting the proper set of de-identification rules 312, token rules 314, and input and output field names and data layouts 316. In certain embodiments, this configuration process is performed using a tool, such as on an online wizard, that walks the user through each step. An example of this can be seen in FIG. 4.

Figure 4:
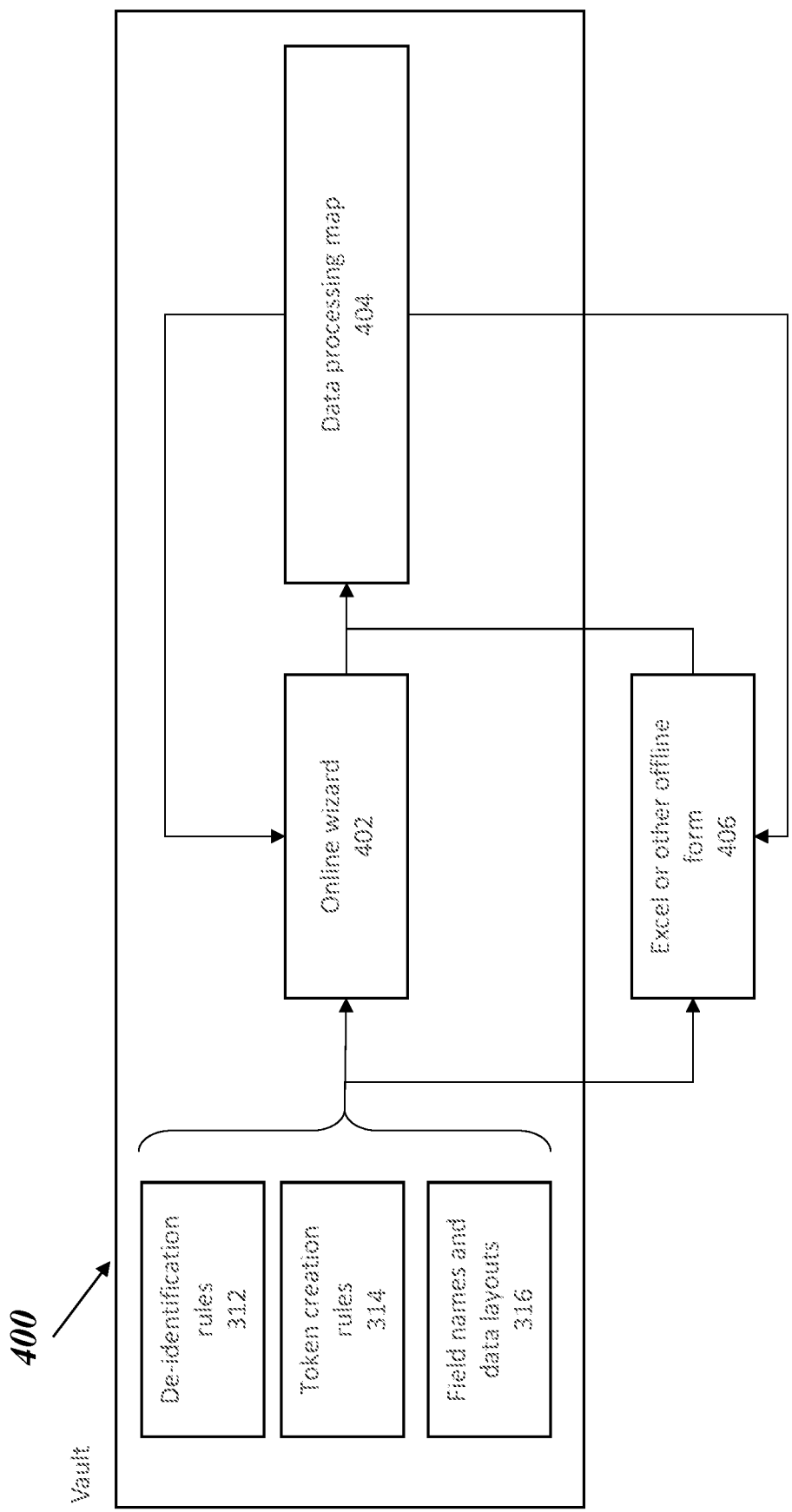
FIG. 4 is a is a diagrammatic illustration of the configuration workflow supported by the Central configuration platform (Vault), with both offline and online options, to create a data processing map in accordance with the aspects of the invention.

FIG. 4 is an exemplary flow diagram 400 of how a tool, such as an online wizard 402, can be used, in the vault 202, to modify elements used in configuring the software 206 that is to be executed on the client computing devices 24. In this example, the specific elements selected from de-identification rules 312, the token rules 314, and the input and output field names and data layouts 316 are stored as a specific data processing map 404. In some embodiments, the configuration can also be performed in an offline form 406 that is downloaded from the Vault 202, and contains all of the elements, such as de-identification rules 312, the token rules 314, and the input and output field names and data layouts 316 required to configure the Software 206. After the user makes their selections in the offline form 406, the user uploads the offline form 406 back to the Vault 202, where the chosen elements for de-identification rules 312, the token rules 314, and the input and output field names and data layouts 316 are extracted and stored as the data processing map 404. In still other embodiments, the user can build a new data processing map 404 from scratch, or by starting with an existing data processing map 404, which can be edited through the online wizard 402 or downloaded as the offline form 406 for modification. Alternately, adding/modifying/deleting data processing maps 404 may include directly manipulating the data elements in the Vault 202 in a non-wizard interface.

In some embodiments, data processing maps 404 may be shared by users, by sites, and by different tenants. Data processing maps 404 may also be created for standard data layouts (e.g. EDI formats) and for non-standard data layouts by the system provider for use by all tenants.

The online wizard 402 for configuration allows users to rapidly create or modify data processing maps 404 without needing assistance from the provider of the Software 26. This self-sufficiency is also supported by allowing use of the offline form 406, which is beneficial to users who want to work on selecting the appropriate configuration elements for de-identification rules 312, the token rules 314, and the input and output field names and data layouts 316 in groups, and/or for users who want to circulate the selected elements among other offline users (e.g. via email) to gather feedback and approvals before uploading to create a final data processing map 404.

In certain embodiments, the Vault 202 can contain multiple additional standardized rule sets and field names and data layouts beyond de-identification rules 312, the token rules 314, and the input and output field names and data layouts 316 to support the configuration of expanded functionality in the Software 206. The rule sets can be combined or segmented in multiple ways to creates lists of different granularity or specificity. Completely custom lists for a subset of tenants can be created and hosted by the Vault 202.

In certain embodiments, online and offline wizards and tools can be provided to support the addition/modification/deletion of sites 308 as well as users and permissions 310.

The use of the Vault 202 allows users to be self-sufficient in the management of their network of installed sites, while taking advantage of common sites 308, de-identification rules 312, token creation rules 314, and field names and data layouts 316. It is also important to note that even though the Vault 202 is multi-tenant 302 and supports custom names 304 for each tenant, the fact that the system is built on a common set of elements 306 means that all data processed by the Software 26 is consistently de-identified and tokenized, allowing the system to be certified once for all installations, and allowing commonly-tokenized data to be matched from any different site, regardless of whether it was originally part of a common network or not.

For an implementation, such as system 200 of FIG. 2, where the a secure data storage module, such as the Secrets system 204, is provided, the configurations made by the users in the Vault 202 are transferred to the Secrets System 204 for secure storage, where they are made available for the Software 206 to retrieve at run time. An example of this can be seen in the flow diagram 500 of FIG. 5.

Figure 5:
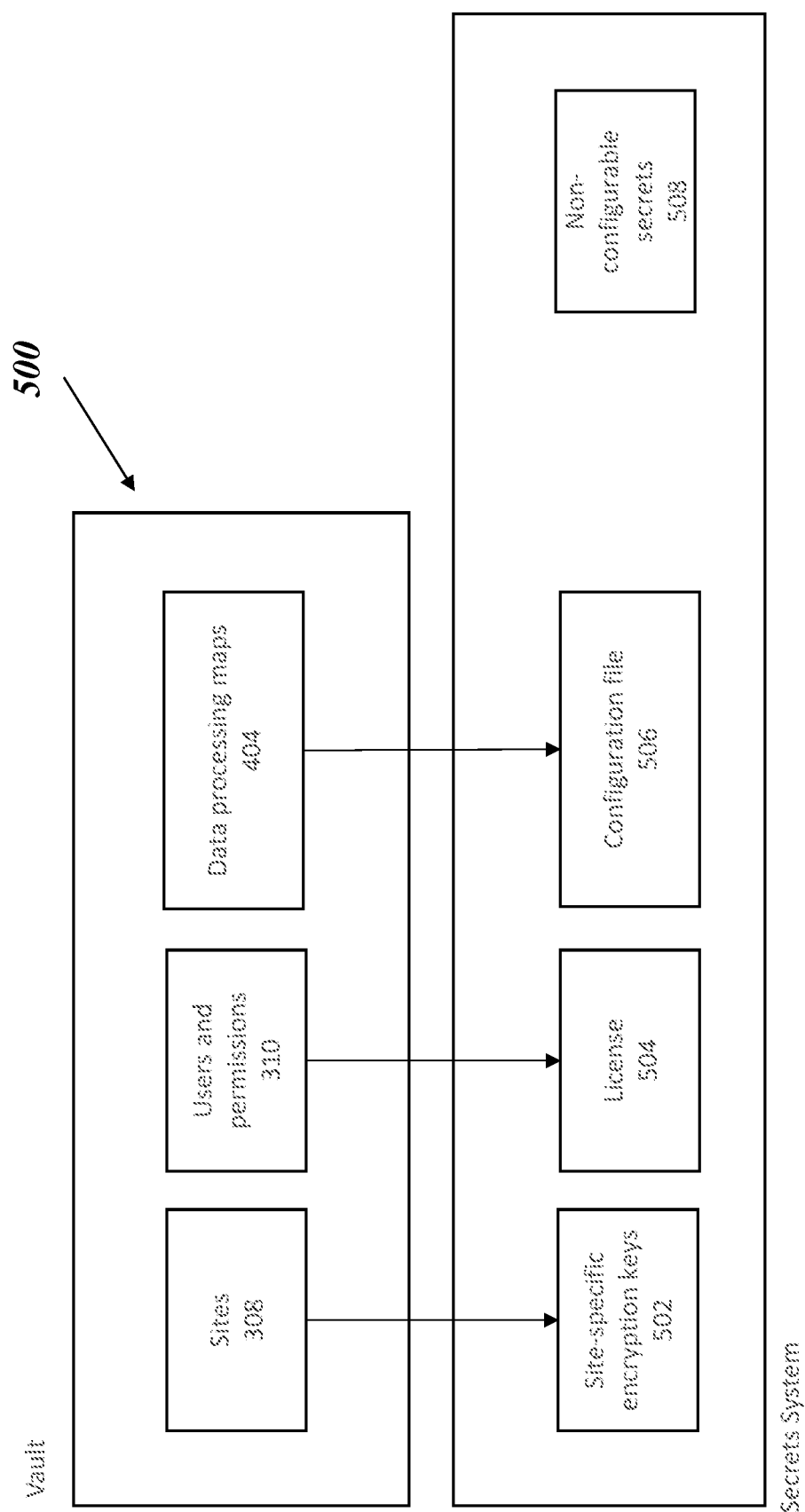
FIG. 5 is a is a diagrammatic illustration of how the secure data storage (Secrets System) stores the data required for the Software to run in accordance with the aspects of the invention.

In the example of FIG. 5, when the user adds or registers a new installation site 308 to their network on the Vault 202, the system generates a new encryption key 502 for that site and passes it to the Secrets System 204 for storage. When a user adds/modifies/or deletes permissions for users 310 on the Vault 202, those permissions are passed and to the Secrets System 204 and stored as a license file 504. When a user adds/modifies/or deletes a data processing map 404 through the configuration process (through online wizard 402 or offline form 406), the system generates a configuration file 506 that is stored in the Secrets System 204. In certain embodiments, a secure data storage module, such as The Secrets System 202, can also store a non-configurable data 508 such as a master hash seed/salt for use by the hash algorithm used in Software 26.

The use of a storage device 20 implemented in a secure data module, such as Secrets System 204, to hold final elements, such as the license file 504 and configuration file 506 ensures that users cannot modify them directly, but only through auditable processes in the Vault 202. Additionally, the storage of private data such as the site-specific encryption keys 502, as well as the non-configurable secret data 508 like master hash seeds/salts, in the Secrets System 204 ensures that users of the Vault 202 cannot view or access these elements, thereby protecting the security of the overall system. In a similar manner, the Secrets system 204 can store any combination of elements to be accessed by the Software 206. Elements stored on in the Secrets System 204 can be shared across users, sites, and tenants, or be unique to each.

However, the use of a secure data module such as the Secrets System 204 is not required. The elements, such as encryption key 502, license file 504, configuration file 506, and non-configurable secret data 508 can be stored in the Vault 202 or in a local file.

Figure 6:
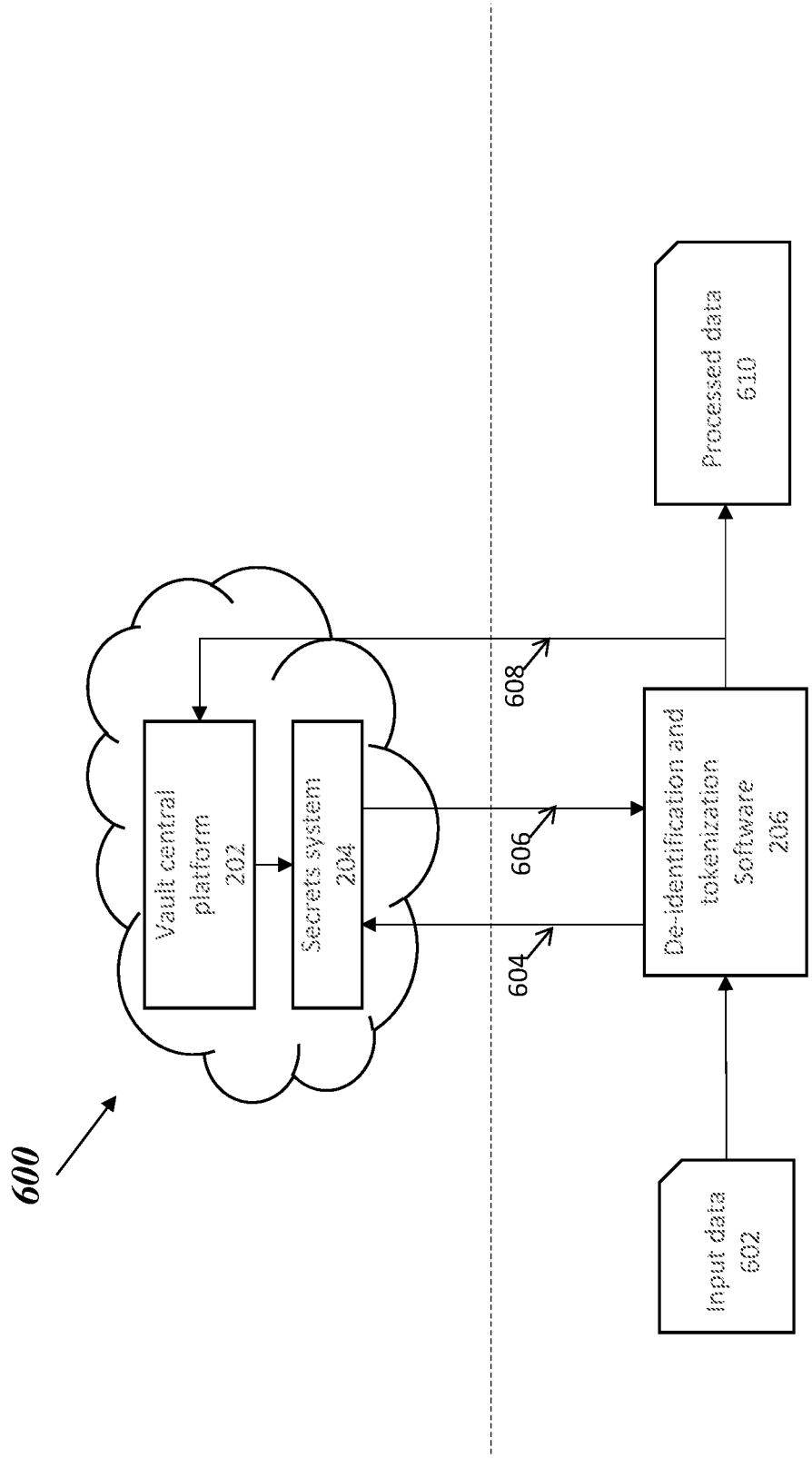
FIG. 6 is a diagrammatic illustration of the interaction of the client Software with the Central configuration platform (Vault) and secure data storage (Secrets System) as it processes data in accordance with the aspects of the invention.

FIG. 6 depicts a system flow diagram 600 of how the various modules of FIG. 2 interact with each other during operation of encrypting data. The Vault 202 and Secrets System 204 are deployed in a cloud configuration while the Software 206 is run locally at the installation site, such as a client computing device 24, to process an input data file 602. At run time, the Software 206 makes a network call 604 to the Secrets System 204. The Software 206 can make a single network call 604 to check for licensing permissions, or can make multiple network calls 604 to verify permissions. Alternatively, the Software 206 can check for permissions through a separate authentication or authorization system. The system checks the license file 504 to determine if the user and site are allowed to perform the requested processing. If the license is valid, the Secrets System 204 returns to the Software 206 the site-specific elements 606 including encryption key 502, configuration file 506, and non-configurable secret data 508 required to properly process the input data file 602. The Software 206 can retrieve the necessary elements from the Secrets System 204 as a single complete file or string, or can retrieve multiple elements through multiple calls to the Secrets System 204 as individual element files or strings. The Software 206 uses the site specific elements as required to run the desired process and output the processed data file 508. In accordance with certain embodiments, during the processing run, and at completion, the Software 206 can pass back real-time monitoring and log information 608 to the Vault 202 for central users to view.

Figure 7:
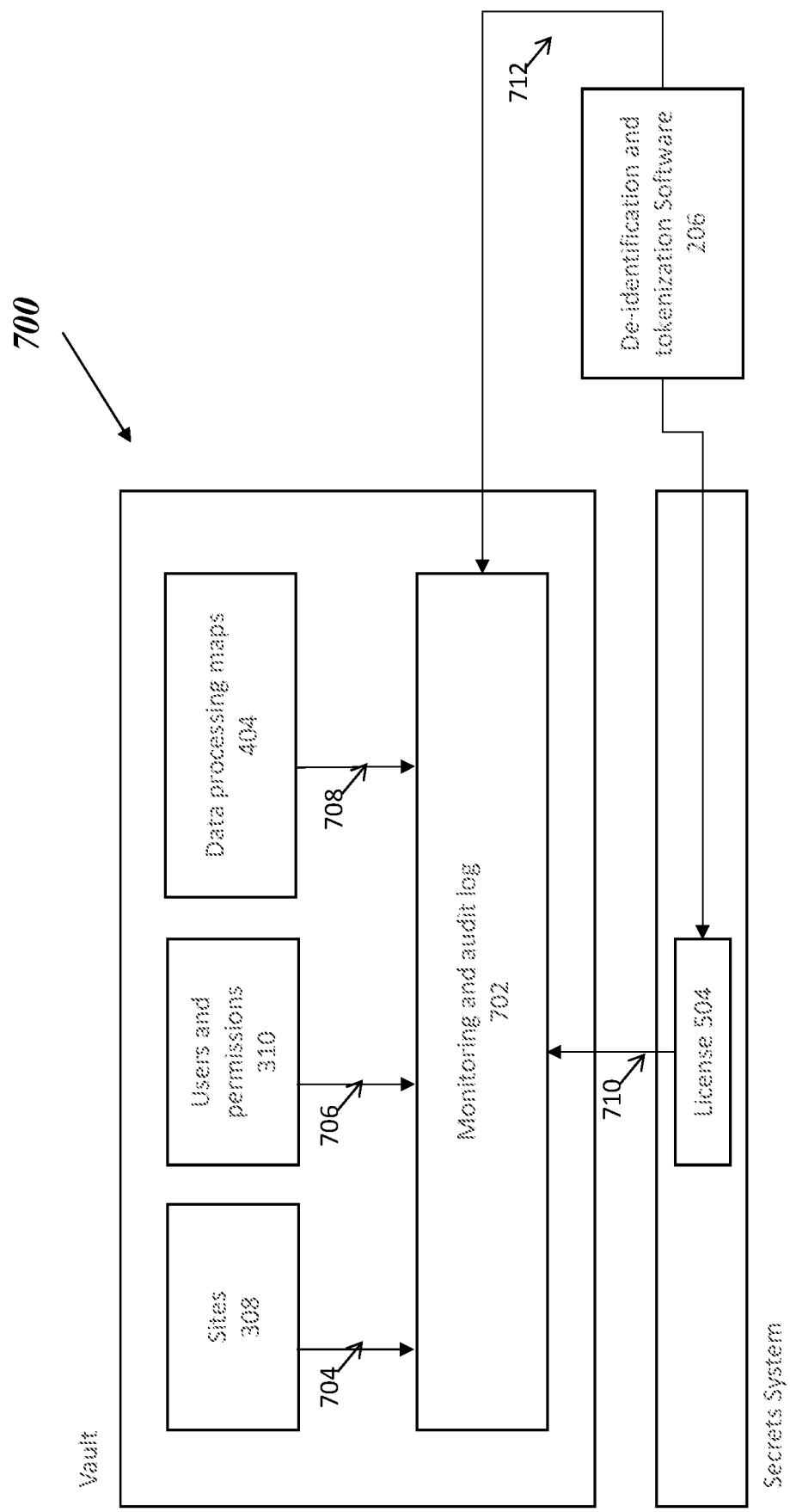
FIG. 7 is a diagrammatic illustration of the collection of data within the audit log from the Central configuration platform (Vault), Secrets System, and Software in accordance with the aspects of the invention.

FIG. 7 depicts a system flow diagram 700 in which the Vault 202 contains a monitoring and audit portal 702 that tracks all changes made in the Vault 202, including a site change 704, a user or permission change 706, or a data processing map change 708. Additionally, when the Software 206 makes a network call requesting a license check to run, that run request 710 is also recorded in the audit log. As mentioned previously, when the Software 206 runs, the real-time monitoring and final log information 712 are passed back to the audit portal 702 for tracking. In certain embodiments, the audit log 702 can collect subsets of the elements described, or can collect additional elements not described. The data collected in the audit log 702 can be exported or streamed via API for viewing as raw data or within other custom or off-the-shelf tools or platforms (e.g. Splunk® by Splunk, Inc.).

Figure 8:
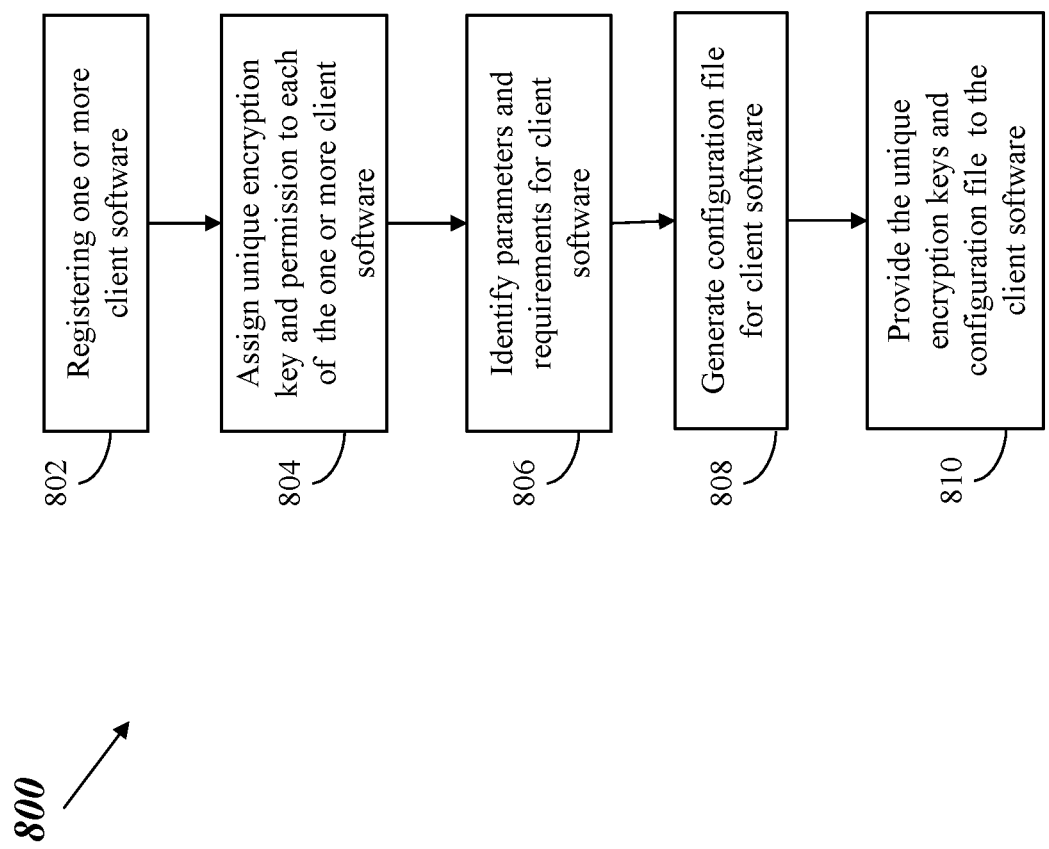
FIG. 8 is an illustrative flow diagram depicting the process performed by the central configuration platform (Vault) during operation in accordance with the aspects of the invention.
Figure 9:
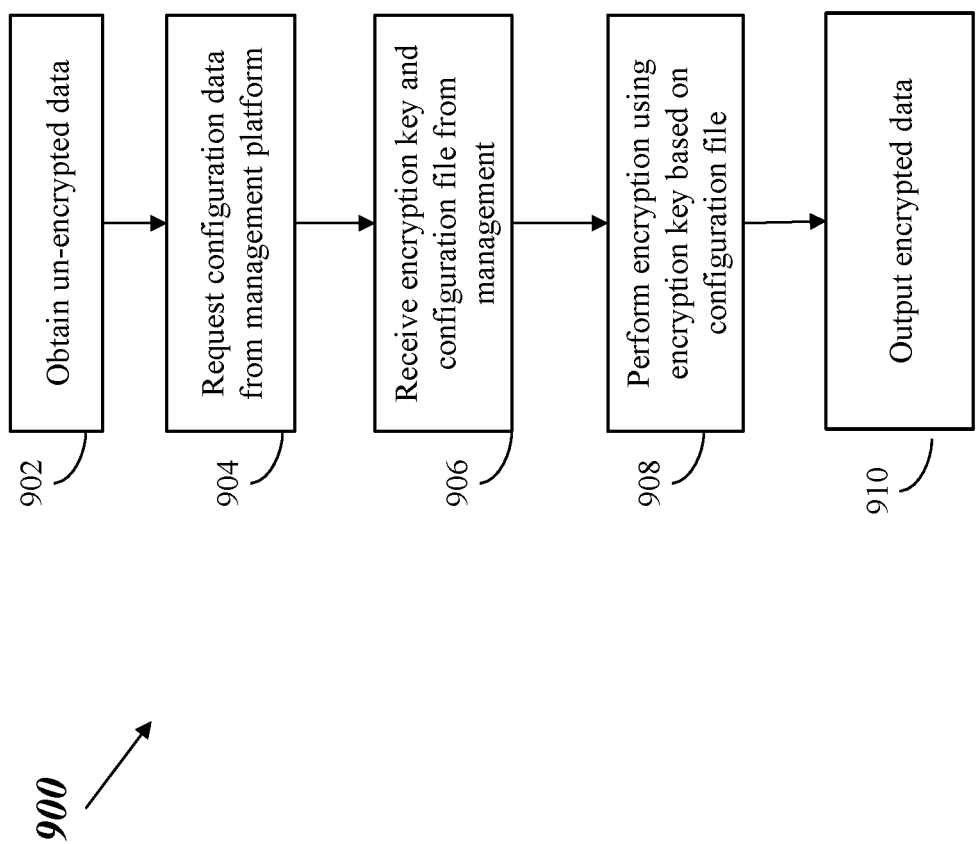
FIG. 9 is an illustrative flow diagram depicting the process performed by the client software during operation in accordance with the aspects of the invention.

FIGS. 8-9 show exemplary flow charts depicting implementation of the processes of the present invention. Specifically, FIG. 8 depicts an exemplary flow chart 800 showing the operation of the centralized management platform 12 or vault 202. In particular, process 800 depicts the operation of the management platform 12 managing data for the one or more instances of distributed client software 206 to facilitate the updated data encryption for data stored on each of the plurality of client computing devices 24. At step 802, the management platform 12 registers on or more instances of client software 206 deployed on one or more client computing devices 24, as discussed with respect to FIG. 1-FIG. 5. In certain embodiments, registration involves adding or otherwise modifying data associated with a site or software instance. At step 804, the management platform 12 assigns unique encryption keys and permissions to each of the one or more registered client software instances on each client computing device 24, as discussed with respect to FIG. 1-FIG. 5. In certain embodiments, the permissions are indicated by a license file 504 generated in response to configured user and permission data 310 for the respective software instance. In some embodiments, the unique encryption key 502 and permission or license file 504 are stored in a storage device 20 configured as a secure data storage (Secrets System 204). At step 806, the management platform 12 identifies the parameter requirements associated with the registered software instance 206 on each client computing device 24, as discussed with respect to FIG. 1-FIG. 5. At step 808, the management platform 12 generates a configuration file 506 for each instance of the software deployed on each client computing devices 24, as discussed with respect to FIG. 1-FIG. 5. In accordance with example embodiments of the present invention, the configuration file 506 is generated from a data processing map 404 which in turn was generated based on de-identification rules 312, token creation rules 314, and field names and data layouts 316 specified for the particular instance of software 206 on the client computing device 24. In some embodiments, the configuration file 506 is stored in a storage device 20 configured as a secure data storage (Secrets System 204). At step 810, the management platform 12 provides the unique encryption key 502 and configuration file 506 to the appropriate software instance 206 deployed on a client computing device 24, as discussed with respect to FIG. 1-FIG. 5. In certain embodiments, the management platform further provides additional data, such as non-configurable private data like master hash seeds/salts.

FIG. 9 depicts an exemplary flow chart showing the operation process of computing devices 12, 14, and 24. In particular, process 900 depicts the operation of the Software 206 on client computing devices 24 when encrypting data records. At step 902, the data 602 to be encrypted is inputted, received, or otherwise obtained, as discussed with respect to FIG. 6. At step 904, the Software 206 on client computing devices 24 requests configuration data from the management platform 12, as discussed with respect to FIG. 6. In certain embodiments, a permission check is performed at the management platform 12 before the system can proceed. At step 906, a unique encryption key 502 and a configuration file 506 is received from the management platform 12, as discussed with respect to FIG. 6. In certain embodiments, additional data, such as non-configurable private data like master hash seeds/salts are also received from the management platform 14. At step 908, encryption on the data is performed based on the received unique encryption key 502 and a configuration file 506 resulting in the output of encrypted data at step 910.

Figure 10:
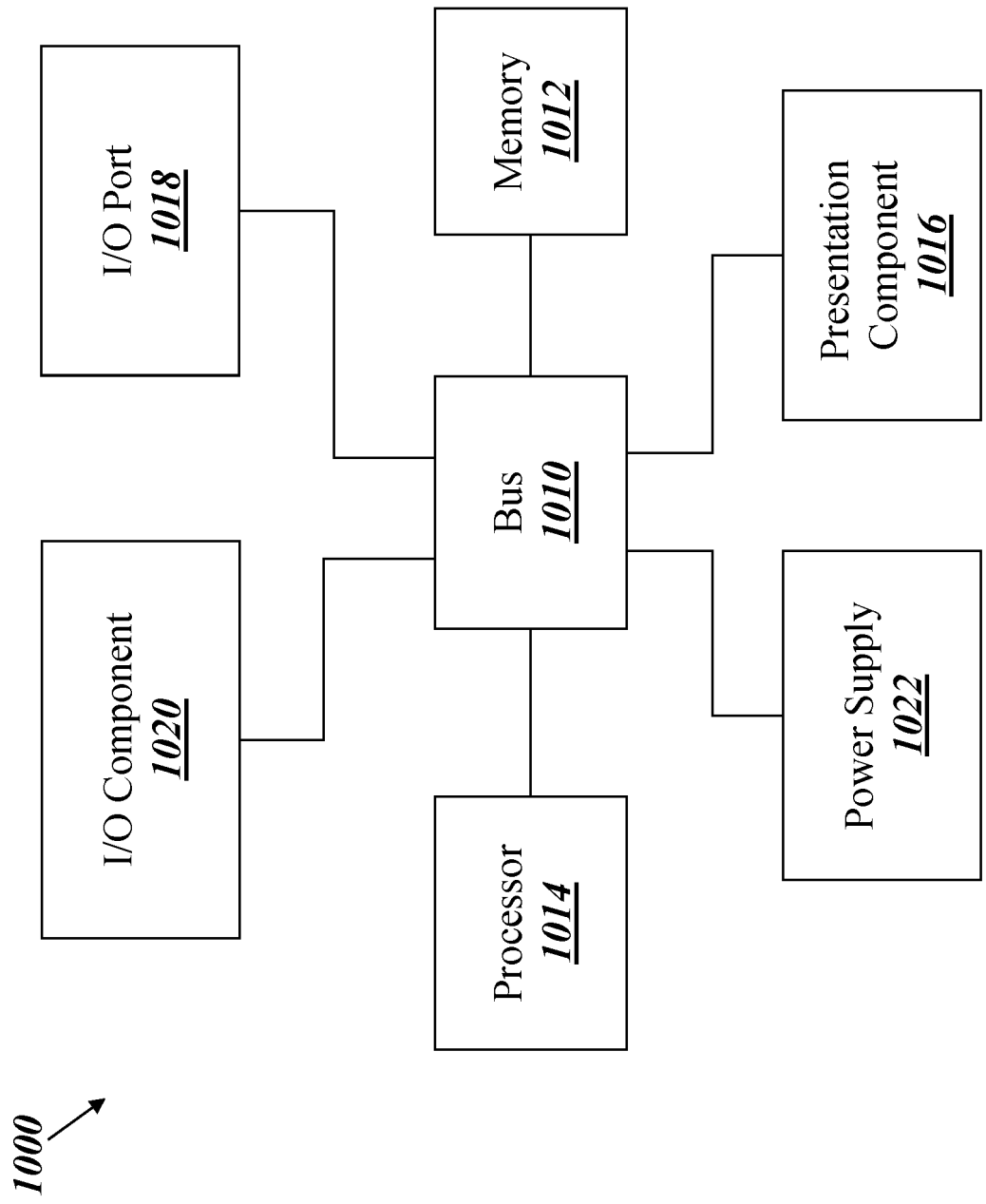
FIG. 10 is a diagrammatic illustration of a high level architecture for devices implementing processes in accordance with the aspects of the invention.

Any suitable computing device can be used to implement the computing devices 12, 14, 30 and methods/functionality described herein. One illustrative example of such a computing device 1000 is depicted in FIG. 10. The computing device 1000 is merely an illustrative example of a suitable computing environment and in no way limits the scope of the present invention. A "computing device," as represented by FIG. 10, can include a "workstation," a "server," a "laptop," a "desktop," a "hand-held device," a "mobile device," a "tablet computer," or other computing devices, as would be understood by those of skill in the art. Given that the computing device 1000 is depicted for illustrative purposes, embodiments of the present invention may utilize any number of computing devices 1000 in any number of different ways to implement a single embodiment of the present invention. Accordingly, embodiments of the present invention are not limited to a single computing device 1000, as would be appreciated by one with skill in the art, nor are they limited to a single type of implementation or configuration of the example computing device 1000.

The computing device 1000 can include a bus 1010 that can be coupled to one or more of the following illustrative components, directly or indirectly: a memory 1012, one or more processors 1014, one or more presentation components 1016, input/output ports 1018, input/output components 1020, and a power supply 1024. One of skill in the art will appreciate that the bus 1010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 10 is merely illustrative of an exemplary computing device that can be used to implement one or more embodiments of the present invention, and in no way limits the invention.

The computing device 1000 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 1000.

The memory 1012 can include computer-storage media in the form of volatile and/or nonvolatile memory. The memory 1012 may be removable, non-removable, or any combination thereof. Exemplary hardware devices are devices such as hard drives, solid-state memory, optical-disc drives, and the like. The computing device 1000 can include one or more processors that read data from components such as the memory 1012, the various I/O components 1016, etc. Presentation component(s) 1016 present data indications to a user or other device. Exemplary presentation components include a display device, speaker, printing component, vibrating component, etc.

The I/O ports 1018 can enable the computing device 1000 to be logically coupled to other devices, such as I/O components 620. Some of the I/O components 1020 can be built into the computing device 1000. Examples of such I/O components 1020 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method for centrally managing one or more instances of encryption software deployed remotely, the method comprising:
    registering, at a central management platform comprising one or more computing devices with processors, memory and storage, one or more instances of software deployed on one or more client devices comprising processors, memory and client storage devices;
    assigning, at the central management platform, a unique encryption key and permissions to each of the one or more registered instances of software deployed on one or more client devices;
    identifying, at the central management platform, parameters and requirements for each of the one or more registered instances of software deployed on one or more client devices;
    generating, at the central management platform, a configuration file for each of the one or more registered instances of software deployed on one or more client devices;
    providing the unique encryption key and the configuration file to each of the one or more registered instances of software deployed on one or more client devices; and
    storing the unique encryption key, the permissions, and the configuration file for each of the one or more registered instances of software deployed on one or more client devices using a secure data storage module that provides an implementation of the storage isolated and secure from the centralized management platform, enabling client computing devices to communicate with the central management platform to obtain necessary data to encrypt data on the one or more client devices over one or more telecommunication networks to enable encrypting data records stored by each of the one or more client devices.

2. The method of claim 1, wherein registering one or more instances of software comprises modifying parameters and requirements for the one or more instances of software deployed on one or more client devices.

3. The method of claim 2, wherein the parameters and requirements comprise deployment sites, user permissions, de-identification rules, token creation rules, and field names and data layouts for associated with each of the registered instances of software.

4. The method of claim 2, further comprising tracking, using a monitoring and audit portal, any changes made to the parameters and requirements.

5. The method of claim 1, wherein the permissions for each of the registered instances of software or user thereof are based on a license file associated with each of the one or more registered instances of software deployed on one or more client devices or user thereof.

6. The method of claim 1, wherein the generating of a configuration file is based on a data processing map that is generated based on de-identification rules, token creation rules, and field names and data layouts associated with each of the registered instances of software.

7. The method of claim 6, wherein the unique encryption keys and the token creation rules are used by the central management platform to provide token management of the data records on each of the one or more client devices.

8. The method of claim 6, wherein the central management platform comprises additional standardized rule sets and field names and data layouts beyond the de-identification rules, the token creation rules, and the input and output field names and data layouts, that are combined or segmented in multiple ways to creates lists of different granularity for one or more of a subset selected from the group consisting of users, sites, tenants and the one or more registered instances of software deployed on one or more client devices.

9. The method of claim 1, wherein additional data, comprising non-configurable secret data comprising master hash seeds or salts, are also provided by the central management platform to be used in encrypting data records stored for each of the one or more client devices.

10. A method of encrypting data using deployed software which is managed centrally, the method comprising:
    obtaining, at a client device comprising a processor, memory, and a storage device, and operating a deployed instance of centrally managed software, data to be encrypted;
    requesting, at the client device operating a deployed instance of centrally managed software, configuration data for centrally managed software from a central management platform comprising one or more computing devices with processors, memory, and storage;
    receiving, at the client device operating a deployed instance of centrally managed software, a unique encryption key and a configuration file for the deployed instance of the centrally managed software from a central management platform;
    performing, at the client device operating a deployed instance of centrally managed software, encryption on the obtained data based on the received unique encryption key and a configuration file for the deployed instance of the centrally managed software from a central management platform; and
    outputting, at the client device operating a deployed instance of centrally managed software, data encrypted by the deployed instance of the centrally managed software based on the received unique encryption key and a configuration file for the deployed instance of the centrally managed software from a central management platform.

11. The method of claim 10, wherein receiving the unique encryption key and configuration file is conditioned upon successful verification of credentials using a permission check performed at the central management platform.

12. The method of claim 11, wherein the permission check further comprises the central management platform checking a license file to determine if a user and site are allowed to perform requested processing, wherein if the license file is valid, the secure data storage module returns to the centrally managed software certain site-specific elements comprising the unique encryption key, the configuration file, and non-configurable secret data required to properly process data records or an input data file.

13. The method of claim 12, wherein the centrally managed software uses the site-specific elements retrieved from the central management platform to process the data records or the input data file locally, and then discards the site-specific elements upon completion, thereby allowing a most current version of the site-specific elements to be used at each subsequent run.

14. The method of claim 10, wherein storage of private data including the site-specific elements comprising the unique encryption key, the configuration file, and the non-configurable secret data comprising master hash seeds or salts, using the secure data storage module, prevents users of the central management platform from viewing or accessing the site-specific elements, thereby protecting overall security of the system, and wherein use of a storage device implemented in a secure data storage module, to also hold final elements, comprising a license file and configuration file, prevents users from modifying the license file and configuration file directly, only allows modification through auditable processes using the central management platform, wherein whenever the centrally managed software makes a network call requesting a permission check to run, the network call and the permission check are also recorded in an audit log.

15. The method of claim 10, wherein whenever a user adds permissions or modifies any of the permissions, including by deleting permissions, on the central management platform, those permissions are passed to the secure data storage module and stored as a license file, and whenever a user adds a data processing map or modifies a data processing map, including by deleting a data processing map, using configuration processes, the system generates a configuration file that is transferred to and stored using the secure data storage module, where that configuration file is then made available for the centrally managed software to retrieve at run time, such that changes to the license file and changes to the configuration file are made in real-time so as to be available without any change to the locally-installed software.

16. The method of claim 10, further comprising providing to the central management platform, a log for the encryption performed on the obtained data based on the received unique encryption key and a configuration file for the deployed instance of the centrally managed software from a central management platform.

17. A system for centrally managing one or more instances of encryption software deployed remotely, the system comprising:
  a central management platform comprising one or more computing devices with processors, memory, and a storage for storing a data associated with one or more instances of software deployed on one or more client devices comprising processors, memory and client storage devices, the central management platform configured to:
    register one or more instances of software deployed on one or more client devices;
    assign a unique encryption key and permissions to each of the one or more registered instances of software deployed on one or more client devices;
    identify parameters and requirements for each of the one or more registered instances of software deployed on one or more client devices;
    generate a configuration file for each of the one or more registered instances of software deployed on one or more client devices;
    provide the assigned unique encryption key and generated configuration file to each of the one or more registered instances of software deployed on one or more client devices; and
  a secure data storage module, comprising the storage isolated and secure from the centralized management platform, configured to store the unique encryption key, the permissions, and the configuration file for each of the one or more registered instances of software deployed on one or more client devices, and enable the one or more client devices to communicate with the central management platform to obtain necessary data to encrypt data on the one or more client devices over one or more telecommunication networks to enable encrypting data records stored by each of the one or more client devices.

18. The system of claim 17, further comprising a secure data storage module comprising a storage operable to store the unique encryption key, permissions, and configuration file for each of the one or more registered instances of software deployed on one or more client devices.

19. The system of claim 17, further comprising one or more client devices comprising a client storage device for storing a deployed instance of centrally managed software, the one or more client devices configured by the centrally managed software to:
  obtain data to be encrypted;
  request configuration data for centrally managed software from the central management platform;
  receive a unique encryption key and a configuration file for the deployed instance of the centrally managed software from the central management platform;
  perform encryption on the obtained data based on the received unique encryption key and a configuration file; and
  output data encrypted based on the received unique encryption key and a configuration file.

20. The system of claim 17, further comprising a monitoring and audit portal configured to track any changes made to the parameters and requirements and receive and store a log provide from the client device, wherein the system comprises a common set of elements used for all data processed by the centrally managed software so that all data is consistently de-identified and tokenized, enabling the system to be certified once for all installations, and enabling commonly-tokenized data to be matched from any different site, regardless of whether it originated from a common network.

* * * * *